United States Patent Office 3,068,282
Patented Dec. 11, 1962

3,068,282
PROCESS FOR THE MANUFACTURE OF N-SULPHONYL-N'-ACYL-UREAS
Walter Aümuller, Rüdi Weyer, and Gerhard Korger, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed May 23, 1958, Ser. No. 737,235
Claims priority, application Germany May 25, 1957
1 Claim. (Cl. 260—553)

The present invention relates to N-sulphonyl-N'-acylureas and a process for their manufacture.

We have found that many N-sulphonyl-N'-acyl-ureas of the general formula

in which R is a phenyl group wherein one or two hydrogen atoms may be substituted by alkyl or alkoxy groups of which the alkyl group contains at most 8 carbon atoms, or by halogen atoms, or represents a naphthyl- or a 5:6:7:8-tetrahydronaphthyl radical or an aliphatic or cycloaliphatic hydrocarbon radical containing at most 8 carbon atoms, and $R_1$ represents a hydrocarbon radical, possess an activity in lowering the blood sugar level and that all of the aforesaid ureas are valuable intermediary products in the preparation of sulphonyl ureas having said activity.

A further object of the present invention is a process for the preparation of such N-sulphonyl-N'-acyl-ureas of the formula given above, which comprises reacting sulphonyl ureas of the formula

in which R has the aforesaid meaning, in the presence of catalysts with an excess of carboxylic anhydrides or mixed carboxylic anhydrides or carboxylic halides.

It is known to prepare N - benzene - sulphonyl - N'-benzoyl-urea from benzoyl-isocyanate and benzene-sulphonamide (cf. Billeter, Ber. dtsch. chem Ges. 36, 3218 (1903)) or from benzene-sulphonyl-isocyanates and benzamide (cf. Billeter, Ber. dtsch, chem Ges. 37, 690 (1904)). The last-mentioned article also describes the preparation of the N-benzene-sulphonyl-N'-acetyl-urea from benzene-sulphonyl-isocyanate and acetamide.

A general application of the methods described in the aforesaid articles to the preparation of N-benzene-sulphonyl-N'-acyl-ureas from sulphonyl-isocyanates on a commercial scale has the following drawbacks. According to Billeter the sulphonyl-isocyanates are prepared from sulphonyl halides and silver cyanate. Owing to its high molecular weight a comparatively large amount of silver cyanate is required in this case. That method is accordingly not appropriate for use in the preparation of larger quantities of sulphonyl isocyanates. There has also been developed another method of preparing sulphonyl isocyanates. According to this method sulphonamides are used as starting material and are reacted with phosgene to yield sulphonyl isocyanates (cf. German patent specification 817,602). That process is complicated, too, since the application of the toxic phosgene requires special precautions; besides, it is necessary, as technical experiments have shown, to purify the reaction product by distillation, for due to the high temperature of phosgenation it contains considerable portions of sulphochlorides.

Moreover, the application of sulphonyl isocyanates involves further difficulties which are due to the known reactivity of these compounds. Benzene-sulphonylisocyanate reacts, for example, already with the atmospheric moisture and is thus converted into benzene-sulphonamide so that the preparation and subsequent treatmen have to be carried out with the strict exclusion of moisture.

When preparing N-benzene-sulphonyl - N' - acyl-ureas from benzene-sulphonamides and carboxylic acid isocyanates similar inconveniences occur. The acyl-isocyanates can be prepared from carboxylic acid chlorides and silver cyanate but in a complicated manner and apart from being sensitive—especially to water—the aforesaid compounds exhibit the drawback of polymerizing relatively easily.

Consequently, the two aforesaid known processes are not suitable for the preparation of N-sulphonyl-N'-acylureas on an industrial scale. The industry is, therefore, interested in the development of other processes for the manufacture of these compounds.

It is known that N:N'-diacyl-ureas can inter alia be prepared from monoacyl-ureas

and acid chlorides in the presence of a catalyst, the two acyl radicals of the N:N'-diacyl-ureas being carboxylic acid radicals (cf. Stoughton, J. of Org. Chem. 2, 514 (1938)). For this purpose the following method has hitherto been applied. The monoacyl-urea, aproximately one equivalent of acid chloride and catalytic amounts of sulphuric acid are heated for 5 to 6 hours with the addition of benzene in which the monoacyl-urea is not soluble. In the course of the reaction a solution forms from which the reaction product is precipitated with petroleum ether. It was, however, not to be expected that sulphonyl ureas ($R-SO_2-NH-CO-NH_2$), too, could directly be acylated with carboxylic acid chlorides or anhydrides to yield N-sulphonyl-N'-acyl-ureas, for these compounds are undoubtedly a special class of substances and not to be compared to the acyl ureas. Even their preparation is carried out according to altogether different methods. Ureas can be converted to acyl ureas by simple heating with carboxylic acid anhydrides or chlorides. When trying to prepare a sulphonyl urea in an analoguous manner from a sulphochloride, urea products are obtained that are derivatives of cyanamide (cf. Kurzer, Chem. Rev. 50, 4 (1952)). The two groups of compounds differ also very much in their reactions. Contrary to acyl-ureas, sulphonyl-ureas are weak acids which are already soluble in ammonia solution of 1% strength and form almost neutral salts with alkalies. Their reactive part is the hydrogen of the sulphonamide group. Sulphonyl-ureas and acyl-ureas also differ in their behaviour towards acetic acid and anhydride. When trying to acetylate toluene-sulphonyl-urea by heating it, for example, for 2 hours with acetanhydride, the urea grouping is destroyed and acetyl-toluene-sulphonamide is isolated. Under these conditions the acetyl-urea does not undergo any change and recrystallizes after cooling; nor is any mention to be found in literature that attempts have been made to carry out a direct acylation of the sulphonyl-ureas.

The reaction conditions of the process of the present invention may vary within wide limits. Carboxylic anhydrides, carboxylic acid halides and mixed anhydrides may be applied for the acylation. The reactants are suitably reacted in an excess of the anhydride or the halide, with or without the addition of an organic solvent. The reaction can be carried out at temperatures ranging within wide limits. It can be effected at room temperature as well as at an elevated temperature. It is preferably carried out at a moderately elevated temperature. As catalysts there are advantageously used strong acids, preferably sulphuric acid, phosphoric acid and perchloric acid. There may also be used other acid catalysts, such as zinc chloride and aluminum chloride. Especially when moderately heated, the sulphonyl-urea dissolves within a few minutes in the excess of anhydride or halide to which the catalyst, which is preferably sulphuric acid, has been added, and in most cases the reaction product crystalizes out immediately when cooling or it can be separated by way of precipitation with a suitable organic solvent or by decomposition of the excess of anhydride or halide by means of ice water. As reaction components there may be used, for example, benzene-sulphonyl-urea, 4-methyl-benzene-sulphonyl-urea, 3:4 - dimethyl-benzene-sulphonyl - urea, 4 - isopropyl - benzene-sulphonyl-urea, 4-chloro-benzene-sulphonyl-urea, 3:4-dichloro - benzene-sulphonyl-urea, 4-methyl - 3 - chloro-benzene-sulphonyl-urea, cyclohexane-sulphonyl-urea, 4-methoxy-benzene-sulphonyl-urea, or naphthalene-sulphonyl-urea. For the acylation there are particularly used acetanhydride, acetyl-chloride, butyric acid anhydride, butyryl-chloride, isobutyric acid chloride, caproic acid chloride, crotonic acid chloride, sorbic acid chloride, cyclohexane-carboxylic acid chloride, benzoyl chloride, toluic acid chloride, phenyl-acetic acid chloride, cinnamic acid chloride and the like as well as corresponding acid bromides and mixed anhydrides.

The process of the present invention is of particular importance to the industry since firstly there are used as starting material sulphonyl-ureas which can easily be prepared by known processes, the easily accessible simple or mixed carboxylic acid anhydrides or halides serving as second reaction component, secondly the process can be carried out on an industrial scale, thirdly the use of sulphonyl-isocyanates or acyl-isocyanates whose manufacture and application involves certain inconveniences (use of silver cyanate or phosgene and extreme sensitivity to moisture) is avoided, fourthly, no special apparatus are required and the reaction can be carried out in a very short time and, fifthly, in most cases the products obtained according to the present invention are very pure and crystallize directly from the reaction mixture. They are obtained in excellent yields and can immediately be applied for further purposes.

The products obtained according to the present invention partly possess themselves an activity in lowering the blood sugar level or they are valuable intermediary products to be used in the preparation of medicaments, more especially of medicaments reducing the blood sugar level and being suitable for peroral administration. They may be administered as such or in admixture with usual pharmaceutical carriers, such as starch, milk sugar, tragacanth and magnesium stearate, in the form of suitable preparations and more especially in the form of tablets or dragées.

Owing to the acylation and above all the acetylation according to the process of the present invention the sulphonyl ureas can be converted into a particularly reactive form; when for example, toluene-sulphonyl-urea which has been treated according to the invention is reacted, for example, with n-butylamine a very good yield of the known N-(4-methyl-benzene-sulphonyl)-N'-n-butyl-urea is obtained whereas when the unsubstituted toluene-sulphonyl-urea is used considerably poorer yields are obtained.

The following examples serve to illustrate the invention but they are not intended to limit it thereto:

EXAMPLE 1

N-(4-Methyl-Benzene-Sulphonyl)-N'-Acetyl-Urea 5 grams of N-(4-methyl-benzene-sulphonyl)-urea are suspended in 30 cc. of acetic anhydride. 30 drops of concentrated sulphuric acid are added whereupon a part of the substance is dissolved. After a short time further crystals separate out. To complete the reaction the reaction mixture is heated for about 5 to 10 minutes on the steam bath whereby the substance dissolves with a slight yellow colouration. On cooling the N-(4-methyl-benzene-sulphonyl)-N'-acetyl-urea crystallizes out. The product is filtered off with suction, washed with cold ethyl acetate and then dried on the steam bath. There are obtained 4.1 grams of N-(4-methyl-benzene-sulphonyl)-N'-acetyl-urea melting at 181 to 182° C. After recrystallization from methanol the melting point does no longer change. Further amounts of substance are obtained from the mother liquor by decomposition with water. The total yield amounts to about 85%.

An excellent yield of the same product is obtained when 5 grams of N-(4-methyl-benzene-sulphonyl)-urea, 30 cc. of acetic anhydride and 5 grams of o-phosphoric semihydrate are heated for 10 minutes on the steam bath.

5.4 grams of N-(4-methyl-benzene-sulphonyl)-urea, 15 ml. of acetyl chloride and 10 drops of concentrated sulphuric acid are heated to the boil for 5 minutes under reflux. The solution so obtained is allowed to cool, the product which has crystallized out is filtered off with suction and dried. There are obtained 5.8 grams (90%) of N-(4-methyl-benzene-sulphonyl)-N'-acetyl-urea melting at 181 to 182° C. After recrystallization from benzene the substance melts at 182° C. To destroy the acetyl chloride ice is added to the reaction mother liquor whereupon some more reaction product precipitates. There are obtained another 0.4 gram of N-(4-methyl-benzene-sulphonyl)-N'-acetyl-urea having a lower degree of purity.

In an analogous manner there is obtained from N-(4-methyl-benzene-sulphonyl)-urea and propionic anhydride or propionyl chloride, the N-(4-methylbenzene-sulphonyl)-N'-propionyl-urea melting at 122 to 124° C.

EXAMPLE 2

N-(4-Methyl-Benzene-Sulphonyl)-N'-Butyryl-Urea 5 grams of N-(4-methyl-benzene-sulphonyl)-urea, 30 cc. of butyric anhydride and 30 drops of concentrated sulphuric acid are heated for 10 minutes on the steam bath. There is obtained a solution of a slight yellow colouration from which 4.7 grams of N-(4-methyl-benzene-sulphonyl)-N'-butyryl-urea melting at 135 to 139° C. crystallize out after cooling. Another small quantity of substance can be obtained from the mother liquor by precipitation with petroleum ether or by decomposition of the anhydride by means of water.

In an analogous manner there is obtained from N-(4-methyl-benzene-sulphonyl)-urea and isobutyric anhydride the N-(4-methyl-benzene-sulphonyl) - N'-isobutyryl-urea melting at 165 to 167° C.

In the same manner N-(4-ethyl-benzene-sulphonyl)-N'-butyryl-urea melting at 137 to 139° C. is obtained from N-(4-ethyl-benzene-sulphonyl)-urea and butyric anhydride.

N-(benzene-sulphonyl)-N'-butyryl-urea melting at 116 to 118° C. is likewise obtained in this manner from N-benzene-sulphonyl-urea and butyric anhydride.

EXAMPLE 3

N-(4-Methyl-Benzene-Sulphonyl)-N'-Sorbinyl-Urea 5.4 grams of N-(4-methyl-benzene-sulphonyl)-urea, 15 ml. of sorbinyl chloride and 15 drops of concentrated sulphuric acid are heated on the steam bath under reflux. After about 10 minutes the urea is dissolved. The solution is allowed to cool and in order to improve the separation of the reaction product a small amount of benzene is added. The precipitate is then filtered off with suction. There are obtained 4.5 grams of N-(4-methyl-benzene-sulphonyl)-N'-sorbinyl-urea which after recrystallization from benzene melts at 163 to 165° C.

In an analogous manner N-(4-methyl-benzene-sulphonyl)-N'-undecylenyl-urea melting at 102 to 103° C. is obtained from N-(4-methyl-benzene-sulphonyl)-urea and undecylenic acid chloride.

EXAMPLE 4

N-(4-Methyl-Benzene-Sulphonyl)-N'-Hexahydro-Benzoyl-Urea 5 grams of N-'4-methyl-benzene-sulfonyl)-urea, 30 cc. of hexahydro-benzoyl-chloride and 30 drops of concentrated sulphuric acid are heated on the steam bath. Within 2 to 3 minutes the substances dissolve with the evolution of gas. After a short time spontaneous crystallization takes place. The matter is allowed to cool, the resulting crystals of N-(4-methyl-benzene-sulphonyl)-N'-hexahydro-bonzoyl-urea are filtered off with suction and washed with a small amount of ether. There are obtained 7.4 grams of the aforesaid compound which melts at 180 to 181° C. After recrystallization from dioxane the substance melts at 182 to 183° C.

In an analogous manner there is obtained from N-(4-methyl-benzene-sulphonyl)-urea and isovaleric acid chloride N-(4-methyl-benzene-sulphonyl)-N'-isovaleryl-urea melting at 155 to 157° C.

N-(4-methyl-benzene-sulphonyl)-N'-valeryl-urea which melts at 115.5 to 117° C. is likewise obtained in this manner from N-(4-methyl-benzene-sulphonyl)-urea and valeric acid chloride.

N-(4-methyl-benzene-sulphonyl)-N'-capronyl-urea melting at 104 to 106° C. is obtained from N-(4-methyl-benzene-sulfonyl)-urea and caproic acid chloride.

EXAMPLE 5

N-(4-Methyl-Benzene-Sulphonyl)-N'-Benzoyl-Urea 5 grams of N-(4-methyl-benzene-sulphonyl)-urea, 30 cc. of benzoyl chloride and 30 drops of concentrated sulphuric acid are heated on the steam bath. After 4 to 5 minutes the whole is dissolved and spontaneous crystallization sets in. The matter is allowed to cool and the N-(4-methyl-benzene-sulphonyl)-N'-benzoyl-urea that has formed is filtered off with suction and then washed with ether. The yield obtained by direct crystallization amounts to 5.7 grams melting at 184° C. By the admixture of petroleum ether a further amount of substance can be obtained from the mother liquor. After recrystallization from a mixture of methanol and dioxane the substance melts at 196 to 197.5° C.

EXAMPLE 6

N-(4-Methyl-Benzene-Sulphonyl)-N'-Phenacetyl-Urea 5 grams of N-(4-methyl-benzene-sulphonyl)-urea, 30 cc. of phenylacetic acid chloride and 30 drops of concentrated sulphuric acid are heated on the steam bath for 10 minutes. Evolution of gas and dissolution take place. The mixture is allowed to cool, ice is added and a semisolid precipitate is obtained to which, after decantation of the water, diisopropyl ether is added. A crystalline substance precipitates which is filtered off with suction and recrystallized from ethyl acetate. The N-(4-methyl-benzene-sulphonyl) - N' - phenacetyl - urea thus obtained melts at 167 to 169° C.

EXAMPLE 7

N-(4-Methyl-Benzene-Sulphonyl)-N'-(β-Phenyl-Propionyl)-Urea 5 grams of N-(4-methyl-benzene-sulphonyl)-urea, 30 cc. of hydrocinnamic acid chloride and 30 drops of concentrated sulphuric acid are heated on the steam bath. Within two minutes a solution forms with the evolution of gas. After another minute N-(4-methyl-benzene-sulphonyl)-N'-(β-phenyl-propionyl)-urea spontaneously crystallizes out from the solution. After cooling the crystals are filtered off with suction, washed with ether and dried. There are obtained 7.6 grams of this compound which melts at 188 to 189° C. After recrystallization from methanol the substance melts at 189 to 191° C.

EXAMPLE 8

N-(4-Methyl-Benzene-Sulphonyl)-N'-Cinnamoyl-Urea 5 grams of N-(4-methyl-benzene-sulphonyl)-urea, 30 grams of cinnamic acid chloride and 30 drops of concentrated sulphuric acid are heated on the steam bath. Within 2 to 3 minutes a solution forms with the evolution of gas. After another minute N-(4-methyl-benzene-sulphonyl)-N'-cinnamoyl-urea crystallizes out. The matter is filtered off with suction and washed with ether. 6 grams of a product melting at 179 to 182° C. are obtained. After recrystallization from methanol and dioxane the substance melts at 192 to 194° C.

EXAMPLE 9

N-Benzene-Sulphonyl-N'-Acetyl-Urea 5 grams of N-benzene-sulphonyl-urea, 30 cc. of acetic anhydride and 30 drops of concentrated sulphuric acid are heated on the steam bath for 8 minutes. After 1 to 2 minutes the substance has dissolved with a slightly yellow colouration. The mixture is allowed to cool and the crystals of N - benzene - sulphonyl - N' - acetyl - urea that have formed are filtered off with suction. The yield amounts to 2 grams; the melting point of the product is at 156 to 157.5° C. By decomposition with water another 2.3 grams of N-benzene-sulphonyl-N'-acetyl-urea of the same melting point are obtained from the mother liquor. After recrystallization from methanol the substance melts at 157 to 158° C.

EXAMPLE 10

N-Benzene-Sulphonyl-N'-Capronyl-Urea 10 grams of benzene-sulphonyl-urea, 30 ml. of caproic acid chloride and 20 drops of concentrated sulphuric acid are heated on the steam bath under reflux. Within a short time a clear solution forms. No crystallization takes place on cooling. Petroleum ether is introduced into the solution which is then allowed to stand for some time so that crystallization may take place and the crystals are filtered off with suction. There are obtained 10.5 grams of N-benzene-sulphonyl-N'-capronyl-urea which after recrystallization from petroleum ether and benzene melts at 86 to 88° C.

EXAMPLE 11

N-(4-Isopropyl-Benzene-Sulphonyl)-N'-Crotonyl-Urea 5 grams of N-(4-isopropyl-benzene-sulphonyl)-urea, 13 ml. of crotonic acid chloride and 10 drops of concentrated sulphuric acid are heated on the steam bath for 5 minutes. The reaction product crystallizes out from the clear solution when cooling. It is filtered off with suction. There are obtained 4.5 grams of N-(4-isopropyl-benzene-sulphonyl)-N'-crotonyl-urea melting at 175 to 177° C. After recrystallization from ethanol and water the substance melts at 176 to 178° C.

EXAMPLE 12

N-(4-Methoxy-Benzene-Sulphonyl)-N'-Acetyl-Urea 5 grams of N-(4-methoxy-benzene-sulphonyl)-urea, 30 cc. of acetic anhydride and 30 drops of concentrated sulphuric acid are heated on the steam bath for 7 minutes. After 1 to 2 minutes the whole is dissolved and yields a slightly yellow solution which is allowed to cool. The pre-cooled solution is poured on to ice. There are obtained crystals which are filtered off with suction and recrystallized from methanol. The N-(4-methoxy-benzene-sulphonyl)-N'-acetyl-urea which is obtained in good yield melts at 130 to 132° C.

EXAMPLE 13

*N-(4-Methoxy-Benzene-Sulphonyl)-N'-Butyryl-Urea*

13 grams of N-(4-methoxy-benzene-sulphonyl)-urea, 30 ml. of butyric acid chloride and 20 drops of concentrated sulphuric acid are heated on the steam bath for 10 minutes. A clear solution forms from which the reaction product crystallizes out when cooling. It is filtered off with suction. There are obtained 12.3 grams of N-(4-methoxy-benzene-sulphonyl)-N'-butyryl-urea melting at 127 to 128° C. After recrystallization the substance melts at 128 to 129° C. Another 2 grams of reaction product which are a little inferior in purity are obtained from the mother liquor of the reaction mixture by precipitating it with petroleum ether.

EXAMPLE 14

*N-(4-Methyl-3-Chloro-Benzene-Sulphonyl)-N'-Acetyl-Urea*

5 grams of N-(4-methyl-3-chloro-benzene-sulphonyl)-urea are suspended in 30 cc. of acetic anhydride and 30 drops of concentrated sulphuric acid are added, while stirring, whereby a part of the original precipitate is dissolved. The reaction mixture which after a few minutes undergoes spontaneous dilution is heated on the steam bath for 10 minutes. At the boiling temperature acetic anhydride is added until the whole reaction mixture passes into solution. The solution is then allowed to cool. The N-(4-methyl-3-chloro-benzene-sulphonyl)-N'-acetyl-urea which crystallizes out in the form of needles is filtered off with suction and dried in vacuo over sulphuric acid. Yield: 5.1 grams; melting point: 173 to 174° C. (with decomposition).

EXAMPLE 15

*N-(4-Chloro-Benzene-Sulphonyl)-N'-Acetyl-Urea*

4 grams of N-(4-chloro-benzene-sulphonyl)-urea are suspended in 25 cc. of acetic anhydride and 25 drops of concentrated sulphuric acid are added, while stirring. The initial precipitate immediately dissolves when the sulphuric acid is added. The reaction mixture is heated on the steam bath for 10 minutes, allowed to cool and introduced into a great excess of ice water, while stirring. The precipitate that has separated out is filtered off with suction, washed with water until neutral and dissolved in dilute ammonia solution (1:50). The solution is filtered and subsequently acidified in the hot with hydrochloric acid. The precipitate separating out (N-(4-chloro-benzene-sulphonyl)-N'-acetyl-urea) is filtered off with suction, washed with water and dried on the steam bath. Yield: 3.5 grams; melting point: 158 to 160° C.

EXAMPLE 16

*N-(Naphthalene-2-Sulphonyl)-N'-Acetyl-Urea*

5 grams of naphthalene-2-sulphonyl-urea are suspended in 30 cc. of acetic anhydride and 30 drops of concentrated sulphuric acid are added, while stirring. The reaction mixture is heated on the steam bath for 15 minutes. After cooling the precipitate is filtered off with suction, washed with water until neutral and the N-(naphthalene-2-sulphonyl)-N'-acetyl-urea is dried on the steam bath. Yield: 5.2 grams; melting point: 192 to 193° C. (with decomposition).

By introducing the mother liquor into ice water another 0.5 gram of the aforesaid product can be obtained so that the total yield amounts to 95% of the theoretical yield.

EXAMPLE 17

*N-[Hexane-(1)-Sulphonyl]-N'-Acetyl-Urea*

1.75 grams of N-hexane-(1)-sulphonyl-urea are suspended in 11 cc. of acetic anhydride and 10 drops of concentrated sulphuric acid are added, while stirring, whereby the precipitate immediately dissolves. The mixture is heated on the steam bath for 5 minutes and then introduced, while stirring, into a great excess of ice water. The precipitate that has separated out is filterd off with suction, washed with water, taken up with dilute ammonia solution and filtered. The clear filtrate is reacidified with dilute hydrochloric acid. The N-[hexane-(1)-sulphonyl]-N'-acetyl-urea which separates out in the form of crystals is filtered off with suction, washed with water and dried in vacuo over sulphuric acid. Yield: 1.7 grams; melting point: 189 to 191° C.

EXAMPLE 18

*N-Cyclohexane-Sulphonyl-N'-Acetyl-Urea*

10 grams of N-cyclo-hexane-sulphonyl-urea, 60 cc. of acetic anhydride and 60 drops of concentrated sulphuric acid are heated on the steam bath for 5 minutes. After 2 minutes the urea is dissolved and the solution turns a slight yellow. It is allowed to cool and the crystals of N-cyclo-hexane-sulphonyl-N'-acetyl - urea which have formed are filtered off with suction, washed with ether and dried. There are obtained 8.2 grams of this compound which melts at 152 to 154° C. By introducing water into the mother liquor another 2.2 grams of N-cyclohexane-sulphonyl-N'-acetyl-urea melting at 152 to 154° C. are obtained with violent reaction and after cooling. After recrystallization from methanol the substance melts at 153 to 155° C.

EXAMPLE 19

*N-Cyclohexane-Sulphonyl-N'-Butyryl-Urea*

30 ml. of butyric anhydride and 20 drops of concentrated sulphuric acid are introduced into 10 grams of cyclohexane-sulphonyl-urea and the mixture is heated on the steam bath. Within a short time a clear solution forms from which the reaction products immediately begin to crystallize out. The mixture is allowed to cool, the reaction product is filtered off with suction, washed with a small amount of benzene and dried. There are obtained 9.5 grams of N-cyclohexane-sulphonyl-N'-butyryl-urea melting at 119 to 120° C. After recrystallization the substance melts at 119 to 121° C. Another 1.5 grams of substance melting at 119 to 120° C. are obtained from the mother liquor of the reaction mixture by a treatment with petroleum ether. The total yield amounts to 89%.

We claim:

A process for the preparation of N-sulfonyl-N'-acylureas of the formula

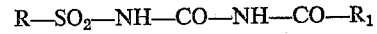

in which R is a member of the group consisting of

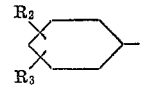

naphthyl, 5, 6, 7, 8-tetrahydronaphthyl, and alkyl, cycloalkyl and cycloalkylalkyl of up to eight carbon atoms; $R_1$ is a member of the group consisting of alkyl of up to five carbon atoms, alkenyl of up to ten carbon atoms, phenyl, phenylmethyl, phenylethyl, styryl and cyclohexyl; $R_2$ and $R_3$ are members of the group consisting of hydrogen, chlorine, alkyl and alkoxy of up to eight carbon atoms; which comprises reacting, at a temperature from about room temperature to reflux temperature, in the absence of a solvent and in the presence of a catalyst of the group consisting of strong inorganic acids zinc chloride and aluminum chloride, a sulfonyl urea of the formula

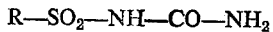

in which R has the meaning given above with an excess amount of a member of the group consisting of carboxylic anhydrides, mixed carboxylic anhydrides and carboxylic halides of the formulae

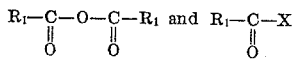

$R_1$ having the aforesaid meaning and X being a member of the group consisting of chlorine and bromine.

References Cited in the file of this patent

UNITED STATES PATENTS

| | | |
|---|---|---|
| 2,135,064 | Whitmore | Nov. 1, 1938 |
| 2,390,253 | Henke | Dec. 4, 1945 |
| 2,560,522 | Duschinsky | July 10, 1951 |
| 2,562,863 | Hoegberg | July 31, 1951 |
| 2,793,977 | Caspe | May 28, 1957 |

FOREIGN PATENTS

| | | |
|---|---|---|
| 1,046,026 | Germany | Dec. 11, 1958 |

OTHER REFERENCES

Billeter: Chem. Berichte, Vol. 37, pages 694–695 (1904).

Stoughton: J. Org. Chem., Vol. 2 (1938), pages 514–519.

Horii et al.: Chem. Abst., Vol. 47, page 2773 (1953).

Fieser and Fieser: Org. Chemistry (1956), pages 235–6 (Third Ed., Reinhold Pub. Corp., N.Y.).